United States Patent
Messaros et al.

(10) Patent No.: US 10,611,552 B2
(45) Date of Patent: Apr. 7, 2020

(54) DISPENSER APPARATUS

(71) Applicants: Michael C. Messaros, Erie, CO (US); Jonathan C. Fragoso, Thornton, CO (US); Shane Vogt, Grand Junction, CO (US)

(72) Inventors: Michael C. Messaros, Erie, CO (US); Jonathan C. Fragoso, Thornton, CO (US); Shane Vogt, Grand Junction, CO (US)

( * ) Notice: Subject to any disclaimer, the term of this patent is extended or adjusted under 35 U.S.C. 154(b) by 387 days.

(21) Appl. No.: 15/645,696

(22) Filed: Jul. 10, 2017

(65) Prior Publication Data

US 2017/0305644 A1    Oct. 26, 2017

Related U.S. Application Data

(63) Continuation-in-part of application No. 14/601,210, filed on Jan. 20, 2015, now Pat. No. 9,730,438.

(51) Int. Cl.
  *A01M 25/00*   (2006.01)
  *B64D 1/12*   (2006.01)
  *B65D 83/04*   (2006.01)
  *B64D 1/16*   (2006.01)

(52) U.S. Cl.
  CPC ......... *B65D 83/0409* (2013.01); *A01M 25/00* (2013.01); *A01M 25/002* (2013.01); *A01M 25/006* (2013.01); *B64D 1/12* (2013.01); *B64D 1/16* (2013.01)

(58) Field of Classification Search
  CPC ......... A01M 23/00; A01M 25/00; B64D 1/02; B64D 1/08; B64D 1/12
  USPC ................................ 43/124; 244/136, 137.1
  See application file for complete search history.

(56) References Cited

U.S. PATENT DOCUMENTS

| | | | | |
|---|---|---|---|---|
| 4,892,255 A | * | 1/1990 | Waldrum | A01M 9/0061 |
| | | | | 239/682 |
| 2017/0231213 A1 | * | 8/2017 | Gordon | A01M 7/0089 |
| | | | | 43/132.1 |
| 2019/0023398 A1 | * | 1/2019 | Albanna | A01N 25/34 |
| 2019/0037828 A1 | * | 2/2019 | Bennett | B64C 39/024 |
| 2019/0307058 A1 | * | 10/2019 | Robbins | A01C 7/081 |

* cited by examiner

*Primary Examiner* — David J Parsley
(74) *Attorney, Agent, or Firm* — Roger A. Jackson

(57) ABSTRACT

A dispenser apparatus for placement in an aircraft to eject an article into a selected external environment, the dispenser apparatus including a long open tray in the form of a bench ejector having a seat and a back, the bench having a primary end portion and an opposing secondary end portion, wherein the bench cradles the article, also included is an arm and finger on the secondary end portion that momentarily retains the article while a reciprocating beam on the primary end portion ejects the article from the bench in a rotating or spinning manner via the beam adding impact force to one side of the article while the arm and finger retain one side of the article to impart the spinning rotation to the article as it is ejected from the bench ejector.

20 Claims, 9 Drawing Sheets

DISPENSER APPARATUS

RELATED PATENT APPLICATION

This is a continuation in part (CIP) patent application of U.S. patent application Ser. No. 14/601,210 filed on Jan. 20, 2015 by Michael C. Messaros et al., of Erie, Colo., US.

STATEMENT OF UNITED STATES FEDERALLY FUNDED RESEARCH

This invention was made with government support under the Animal and Plant Health Inspection Service (APHIS Agreement No. 11-7415-0842-CA) awarded by the United States Department of Agriculture. The United States government has certain rights in the invention.

TECHNICAL FIELD

The present invention relates generally to the deploying of an article and associated article dispenser apparatus arts. More particularly, the present invention of the dispenser apparatus facilitates selectable deployment of an article disposed and stored within the dispenser apparatus wherein the article is transported to a selected location within an external environment and then the article is placed into a selected location within external environment.

BACKGROUND OF INVENTION

The present invention of the dispenser apparatus addresses broadly a problem in the overpopulation of the invasive brown tree snake that was most likely inadvertently introduced into Guam probably from New Guinea nearly seventy years ago; supposedly via post World War II cargo shipments. Since its introduction, the brown tree snake has colonized the entire island of Guam, at densities of up to about 33 snakes per acre in Guam or approximately 1 to 2 million brown tree snakes inhabit the 200 square mile island of Guam. These venomous brown tree snakes have caused the extinction of most of Guam's native birds, bats, and lizards; also the brown tree snakes are feeding on young poultry and other small livestock; in addition to threating human health and safety. Further, the brown tree snakes also cause electrical power outages throughout Guam via wiring damage causing millions of dollars in electrical infrastructure structural damages and lost revenue. The desire for practical technology to aerially deliver baits for brown tree snake control is widespread and has existed for decades. Interested parties include the United States Department of Defense, the United States Department of the Interior, the United States Fish and Wildlife Service, the United States Office of Insular Affairs, the United States Department of Agriculture, the Government of Guam, and others.

In answer to the above identified problem; Federal, state, and territorial governments are committed to reducing the brown tree snake population in Guam, thus also helping to prevent the dispersal of brown tree snakes from Guam to adjacent areas and mitigating the negative effects of the brown tree snakes on Guam. The dispersal of brown tree snakes from Guam via the unintentional movement of snakes as a result of shipping or travel is a very real danger to all islands in the Western Pacific basin and sections of the United States mainland.

To prevent the spread of the brown tree snake, the United States Department of Agriculture's Wildlife Services (WS) program partners with the Government of Guam's Department of Agriculture, the United States Department of Defense (DoD), the United States Department of the Interior's (DoI) Office of Insular Affairs, and the United States Fish and Wildlife Service. A variety of brown tree snake control tools and strategies have been employed, including the use of traps, fumigants, hand capture, snake-detector dogs, public education, and an oral toxicant. A particular toxicant, named acetaminophen, was granted a registration by the United States Environmental Protection Agency in 2003 based on research conducted by Wildlife Service National Wildlife Research Center (NWRC) scientists. The acetaminophen toxicant is currently used in bait stations around shipping ports, the airport, and other easily accessible areas of the Guam Island to help eradicate the brown tree snake. The motivation and desire to develop and implement a practical technology to aerially deliver baits for brown tree snake control has existed for decades.

In summary the benefits of eradicating the brown tree snake population in Guam would be;

1. Facilitating the reintroduction of the endangered Guam Rail and other native species extirpated by the brown tree snake and the restoration of Guam's native ecosystems.
2. Reducing the number of brown tree snake bites to humans and pets (Currently, 1 in 10 emergency room visits in Guam are due to a brown tree snake bite.)
3. Reducing power outages and electrical power infrastructure damage from brown tree snakes electrocuting themselves on power lines and other structures (Currently costs Guam $1-4 million in damages and lost productivity annually.)
4. Preventing brown tree snake colonization colonization on Hawaii or other vulnerable islands in the Pacific (The economic costs of potential brown tree snake colonization to the Hawaiian Islands alone are estimated to be as high as $2 billion annually.)
5. Saving millions of dollars in brown tree snake control costs. The current brown tree snake management protocols are primarily based on the use of traps and snake detector dogs. The overall annual budget for research, educational campaigns, and control efforts (trapping, bait stations, snake detector dogs, aerial baiting, etc.) is approximately $7.5 million annually. The use of toxic bait is currently limited because of the cost and ability to reach all the brown tree snakes in an area. Current bait production depends upon manually inserting an acetaminophen pill into a dead mouse and hand placing dead mice in bait stations. In addition, since the brown tree snakes are arboreal (tree dwelling), a large portion of the snakes will not be exposed to the baits on the ground surface. Employment of a cost-effective aerial baiting strategy will significantly reduce the cost of conducting a brown tree snake baiting program. It is estimated that a Guam snake eradication effort would require the delivery of about 5.2 million baits. At an estimated cost of about $0.99 per bait, this effort would be less costly than the currently annual expenses for brown tree snake control on Guam. However, currently, efforts to reduce the brown tree snake population across Guam have been fairly limited because snakes from rugged and remote areas of Guam have been able to successfully repopulate areas that were once cleared.

Looking at the prior art is this area in the baiting and dispensing/distribution arts for not only pest control, but also bait/cartridge dispensing and distribution, starting with U.S. Pat. No. 8,024,889 to Bunker, disclosed is a pest control method and apparatus that includes a two piece capsule that is in the form of a like mating pair of separable symmetric spherical shells 25 that are tied to one another via an extension 120 that has a releaser 20 disposed on the extension 120. Bunker also has the capsule broken down into version type I being identified as 30 and version type II being identified as 60, thus with version I being spherical—see Bunker FIGS. 1 and 2 and version II being cylindrical—see FIGS. 3, 4A, 4B, 5, 9, and 10. In looking at Bunker FIGS. 4A and 4B, the releaser 20 can either be stowed within the capsule or outside of the capsule, wherein the capsule dispensing gun 130, (Bunker's dispenser apparatus), see FIG. 5, apparently only uses the FIG. 4A version. Bunker has no teaching on how the capsule in FIG. 4A separates in using gun 130 in FIG. 5, other than states the capsule may "separate", see column 3, lines 45-50. In fact the only way that Bunker's capsule could separate on deployment is to have a very loose attachment as between the capsule halves as pictorially shown in FIG. 3, wherein a small partial semi-circular pilot between the capsule halves is shown (element 90 points to this—but is really identifying the interior), if the capsule halves 70/80 where completely disposed one within the other, Bunker's principal of operation would be frustrated as there would be insufficient force to separate the capsules to expose the releaser in the tree branches as shown in FIGS. 6 and 7.

Continuing in the prior art related to ejecting a cartridge not in the snake baiting arts, in U.S. Pat. No. 5,403,225 to Watkins, disclosed is an aerial display amusement device that comprises an elongated, hollow tube containing a plurality of pieces of confetti within the hollow interior of a tube. The user in Watkins holds the lower end of the elongated tube and waves the tube forwardly in an arcuate path so as to generate sufficient centrifugal force to eject the confetti out of the tube and upwardly into the air. In the preferred embodiment in Watkins, the pieces of confetti are of four-sided, tetragonal shape, and pluralities of pieces of confetti are stacked in bundles within the tube such that the bundles exit the tube upwardly in the air and then burst into an aerial display of color and motion as the individual confetti pieces fall downwardly. Watkins is a manually operated device; see FIG. 6, whose primary purpose is to widely dispense the confetti from the tetragonal shape and having the confetti stacked in the tube in a manner that the tetragonal shapes are parallel to one another for maximum dispersion upon release from the tube via manual creation of centrifugal force.

Further, in the prior art related to ejecting a cartridge not in the snake baiting arts, in U.S. Pat. No. 6,692,335 to Wakins, disclosed is a non-explosive system for manual hand launching of streamers from a hollow tube comprising; an elongated hollow launching tube having an open end when launching streamers, a plurality of spiral wound streamers positioned in the launching tube, the streamers being positioned in rows along the length of said launching tube, plus at least the streamers in the row closest to the open end having open hollow cores before insertion into the launching tube and having collapsed cores when inserted into the launching tube, as shown in FIGS. 2, 3, and 4. Thus in Watkins, this is to bias the streamers radially outwardly and form a frictional resistance against ejection of the streamers from the tube, and wherein at least the streamers in the row closest to the open end have central axes about which the streamers are wound, and wherein the central axes are oriented parallel to each other, see FIGS. 1 and 6. As opposed to Watkins '225 (confetti launching) this Watkins '335 is operational to focus on the launching of streamers manually which requires a significant amount of exit force emanating from the manually generated centrifugal force which is forced to be higher from the frictional resistance mentioned above, and also the packed streamers should have higher mass or weight the closer they are to the center of manual centrifugal rotation in order for the higher mass streamers to "push out" the lower mass or weight streamers that are farther from the center of manual centrifugal rotation.

What is needed is a dispenser apparatus for distributing an article termed specifically a container apparatus for improving the way to effectively eradicate the brown tree snake in their arboreal environment using poisonous baits contained in the article. Thus in a broad sense, a delivery apparatus or dispenser apparatus is needed for brown tree snake article baits which could be dropped from an aircraft or even thrust upward from the ground surface and with the bait from the article becoming entangled in the thicket growth or forest canopy as the bait falls to the ground, being that the brown tree snake is an arboreal species, entanglement in the forest canopy is crucial for effective baiting. In addition to improving the performance of the needed baiting apparatus, the U.S. Department of Agriculture's (USDA) Wildlife Services (WS) brown tree snake control program would also need of a system for mass producing of the bait cartridges (being required in the millions) and an automated device for reliable and systematic aerial delivery being the dispenser apparatus of the article bait cartridges.

Ideally a biodegradable bait cartridge and delivery system through the dispenser apparatus would be utilized that can disperse up to about 4 baits per second desirably resulting in a bait about every 15 meters of lateral forest canopy via helicopter or fixed wing aircraft or alternatively ground surface launching of bait cartridges also resulting in a bait about every 15 meters of lateral forest canopy. The development of an article in the form of a biodegradable bait cartridge and automated aerial bait delivery system in the dispenser apparatus would finally allow for large-scale, simultaneous control of brown tree snake populations throughout Guam thereby helping to prevent brown tree snake repopulation.

SUMMARY OF INVENTION

Broadly, the present invention is of a dispenser apparatus for ejecting an article to an external environment, the article having a first end portion and an opposing second end portion with a long axis therebetween, the article further having an article rotational axis disposed between the first and second end portions that is perpendicular to the long axis. The dispenser apparatus including a long open tray in the form of a bench ejector having a seat and a back, the bench having a primary end portion and an opposing secondary end portion with a longitudinal axis therebetween, the bench is sized and configured to cradle the article such that positionally the longitudinal axis and the long axis are substantially parallel to one another.

Further included in the dispenser apparatus is an arm disposed on the bench secondary end portion, the arm including a planar secondary end structure on the bench, said planar secondary end structure is substantially perpendicular to the longitudinal axis, the planar secondary end structure extending from the back toward the seat wherein the planar secondary end structure terminates in a substantially perpendicular finger facing said bench, wherein a portion of the seat, a portion of the back, the planar secondary end structure, and the finger all act to loosely nest the article second end portion.

Also included in the dispenser apparatus is a beam disposed on the bench primary end portion, the beam having a beam proximal end portion and an opposing beam distal end portion, the beam having a beam lengthwise axis that is between the beam proximal and distal end portions, the beam lengthwise axis is substantially perpendicular to the bench longitudinal axis, the beam having reciprocating movement along the beam lengthwise axis. Wherein the beam reciprocating movement extending away from and retracting toward the bench back, the beam distal end portion is operational to contact the article first end portion and push the article first end portion along the bench seat away from the bench back while the arm finger retains the article second end portion momentarily nested in the bench seat and back, thus operationally results in rotational moment movement imparted into the article wherein the rotational moment movement is about the rotational article axis while simultaneously the article ejects away from the bench into the external environment continuing to have the rotational moment movement. In addition, included in the dispenser apparatus is a means for imparting the reciprocating movement to the beam.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 2 shows a use drawing for the dispenser apparatus that includes the helicopter with the dispenser apparatus from FIG. 1 shown mounted in the helicopter cargo bay, note that the mounting of the dispenser apparatus could be mounted on either side of the helicopter, as the helicopter cargo bay has openings on either side of the helicopter, also shown for invention clarity, the helicopter could be flying or on the ground, are the articles being dispensed from the bench ejector, wherein more importantly the articles are ejected in a spinning manner to impart a centrifugal force moment to the article to have the article to separate longwise axially and expand to land and tangle in a growth thicket, wherein the article is fully described in the patent application that this application is a continuation in part of;

FIG. 3 shows a close up perspective view of FIG. 2, wherein FIG. 3 shows the dispenser apparatus ejecting the articles over the growth thicket, noting in particular the planar wind deflectors being one for each dispenser apparatus that are upstream of the bench ejector to deflect the forward wind velocity of the helicopter that was found to interfere with the article ejection from the bench, thus through empirical testing the planar wind deflectors were sized and configured to reduce the airflow interference with the bench ejectors;

FIG. 4 shows a cutaway perspective view of a feed chamber structure that essentially holds a supply of a plurality of articles, the feed chamber is shown in FIGS. 1, 2, and 3, as being positioned behind the bench ejector, i.e. the articles are feed into the bench ejector from behind, wherein FIG. 4 shows the plurality of articles stacked such that the articles each have a long axis, wherein the plurality of long axes are parallel to one another in the packed or stacked configuration, noting that the stacked articles are bunched together via a tension strap that urges the plurality of articles toward an outlet aperture, also noting that in this view a retention door covers the outlet aperture to prevent the plurality of articles from being forced out through the outlet aperture due to the tension band when the feed chamber structure is not engaged to the bench ejector as shown in FIG. 4;

REFERENCE NUMBERS IN DRAWINGS

Figure 1:
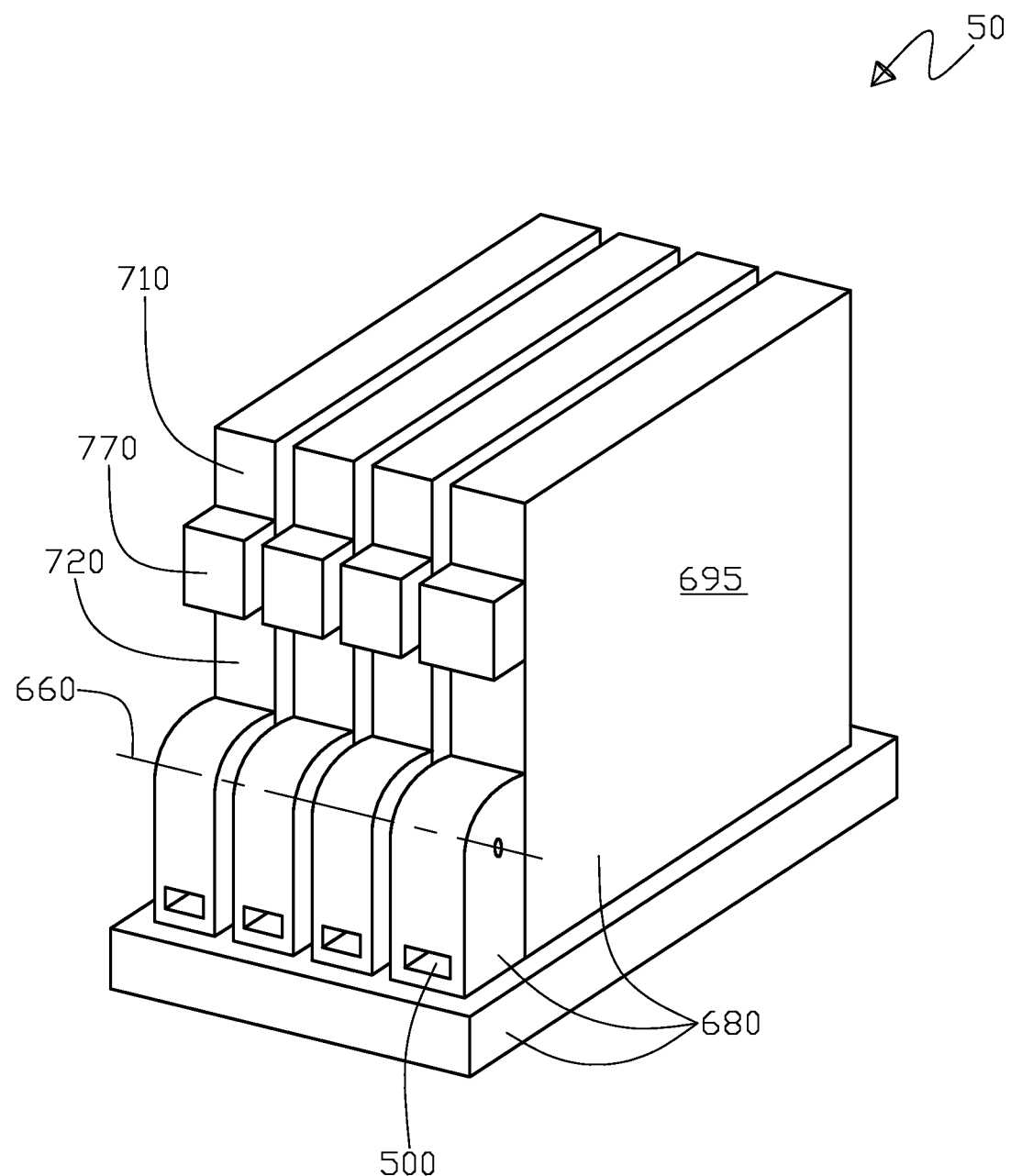
FIG. 1 shows a perspective view of the dispenser apparatus wherein in the preferred embodiment there are a plurality of fully functioning dispenser units positioned side by side, as preferably four are shown in this view within a single frame—being designed to fit within a helicopter cargo bay, however, for clarity a single unit will be described throughout this application, shown are a bench ejector, the rotating drum rotational axis, a take-up reel, and the feed chamber structure.

50 Dispenser apparatus
55 Article
65 Selected thicket growth
70 External environment
85 Long axis of the article 55
90 First end portion of the article 55
105 Second end portion of the article 55
135 Rotational axis of the article 55
140 Position of the rotational axis 135 essentially at a mid-point as between the first 90 and second 105 end portions
145 Perpendicular position of the rotational axis 135 to the long axis 85
445 Initial rotational moment movement of the article 55 about the rotational axis 135
470 Deploying or ejects away of the article 55 from the bench 505 to have the initial rotation 445 about the rotational axis 135
475 Deploying the article 55 to have the initial rotation 445 about the rotational axis 135 from an aircraft 485 flying over a selected thicket growth 65
480 Deploying the article 55 to have the initial rotation 445 about the rotational axis 135 from a ground position 490 adjacent to a selected thicket growth 65
485 Aircraft
490 Ground position
495 Separation expansion of article 55 along long axis 85 from initial rotational movement 445 due to centrifugal force
500 Long open tray in the form of a bench ejector
505 Bench seat
510 Bench back
515 Bench primary end portion
520 Bench secondary end portion
525 Bench longitudinal axis
530 Bench cradling article 55
535 Substantially parallel position of the longitudinal axis 525 and the long axis 85
540 Arm
545 Arm planar secondary end structure
550 Substantially perpendicular position of the planar secondary end structure 545 to the longitudinal axis 525
555 Finger
560 Substantially perpendicular position of finger 555 to the arm 540 planar secondary end structure 545
565 Loosely nesting of the article 55 second end portion 105 by a portion of the seat 505, a portion of the back 510, the planar secondary end structure 545, and the finger 555
570 Beam reciprocating
575 Beam proximal end portion
580 Beam distal end portion
585 Beam lengthwise axis
590 Substantially perpendicular position of the beam lengthwise axis 585 to the bench longitudinal axis 525
595 Reciprocating movement of the beam 570
600 Beam distal end portion 580 contacting the article 55 first end portion 90
605 Beam distal end portion 580 pushing the article 55 first end portion 90 away from the bench back 510
610 Arm 540 finger 555 momentarily retaining the article 55 second end portion 105
615 Means for imparting the reciprocating movement 595 to the beam 570
620 Electrically powered solenoid
625 Feed channel structure
630 Communication between the feed channel structure 625 and the bench back 510
635 Inlet aperture of the feed channel structure 625
640 Directing a plurality of articles 55 by the feed channel structure 625 to the bench 500 one at a time
645 Means to agitate, guide, and shuttle the plurality of articles 55 therethrough the feed channel structure 625 to the bench 500
650 Rotating drum
655 Rubber outer periphery of the drum 650
660 Rotational axis of the drum 650
665 Parallel position of the drum rotational axis 660 to the bench 500 longitudinal axis 525
670 Rotational drum outer periphery 655 positioned adjacent to a portion of the feed channel 625
675 Rotating hub of the rotating drum 650
680 Frame structure
685 Drive motor for the rotating drum 650
690 Rotational direction of the rotating drum 650
695 Rectangular parallelepiped as the article 55 storage and feed chamber structure
700 Parallel position of the article 55 long axes 85
705 Outlet aperture of the rectangular parallelepiped 695
710 Small side of the rectangular parallelepiped 695
715 Portion of the small side 710
720 Retention door for the outlet aperture 705 to hold the articles 55 in the rectangular parallelepiped 695 as against the band 740 urging 745 when the feed chamber structure 695 in not engaged to the inlet aperture 635
725 Removable engagable attachment between the rectangular parallelepiped 695 and the feed channel structure 625 wherein the outlet 705 and inlet 635 apertures are matched 730
730 Matching of the outlet aperture 705 and the inlet aperture 635
735 Communication of articles 55 from the feed chamber structure 695 to the feed channel structure 625
740 Flexible band tension strap
745 Urging of the flexible band 740 ends toward one another
750 Band ends attached to opposing portions of a margin of the outlet aperture 705
755 Primary interior within the rectangular parallelepiped 695
760 Secondary interior within the rectangular parallelepiped 695
765 Band 740 forcing or urging of the plurality of articles 55 toward the outlet aperture 705
770 Take up-reel
775 Rotational attachment of the take-up reel 770 to the portion 715 of the small side 710
780 Rotational bias direction of the take-up reel to cause urging 765 of the articles 55
785 Spring that is wound for the take-up reel to cause the rotational direction 780 the spring 785 can optionally further have a one-way ratchet to only allow the urging direction 745 toward only reducing the primary interior 755 to volume
800 Wind deflection tab that is planar and deflects airflow 805
805 Wind deflection around tab 800 and away from the bench 500 to facilitate easier deployment 470 of the article 55 from the bench 500 from the beam 570 reciprocating movement 595, wherein the article 55 was having blocking interference from the aircraft 485 forward motion wind force
810 Affixment or attachment of tab 800 to the frame 680
815 Parallel extension of planar tab 800 or extension axis 820 to the beam lengthwise axis 585
820 Extension axis of tab 800
825 Span axis of tab 800
830 Distance along extension axis 820
835 Distance along span axis 825
840 Distance for bench 500 from the primary end portion 515 to the secondary end portion 520
850 Index extension structure

DETAILED DESCRIPTION

With initial reference to FIG. 1 shown is a perspective view of the dispenser apparatus 50 wherein in the preferred embodiment there are a plurality of fully functioning dispenser units positioned side by side, as four are shown in this view within a single frame 680—being designed to fit within a helicopter 485 cargo bay, however, for clarity a single unit will be described throughout this application, shown are a bench ejector 500, the rotating drum 650 rotational axis 660, a take-up reel 770, and the article 55 feed chamber structure 695.

Figure 2:
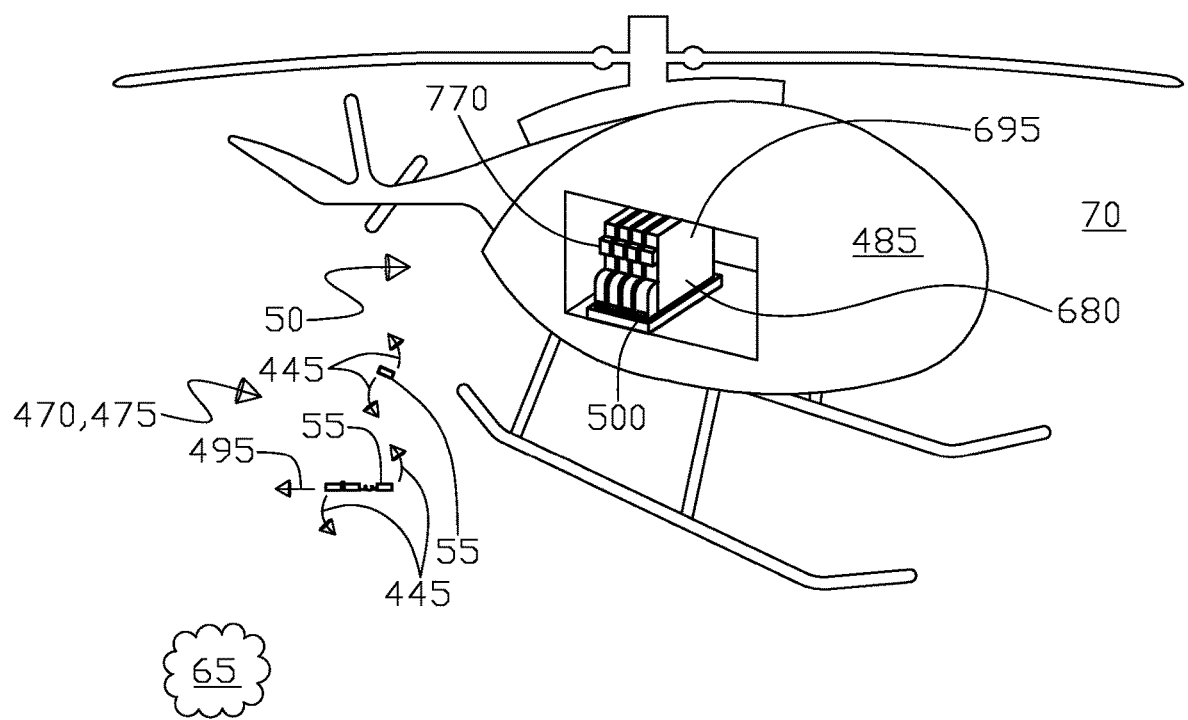
Figure 3:
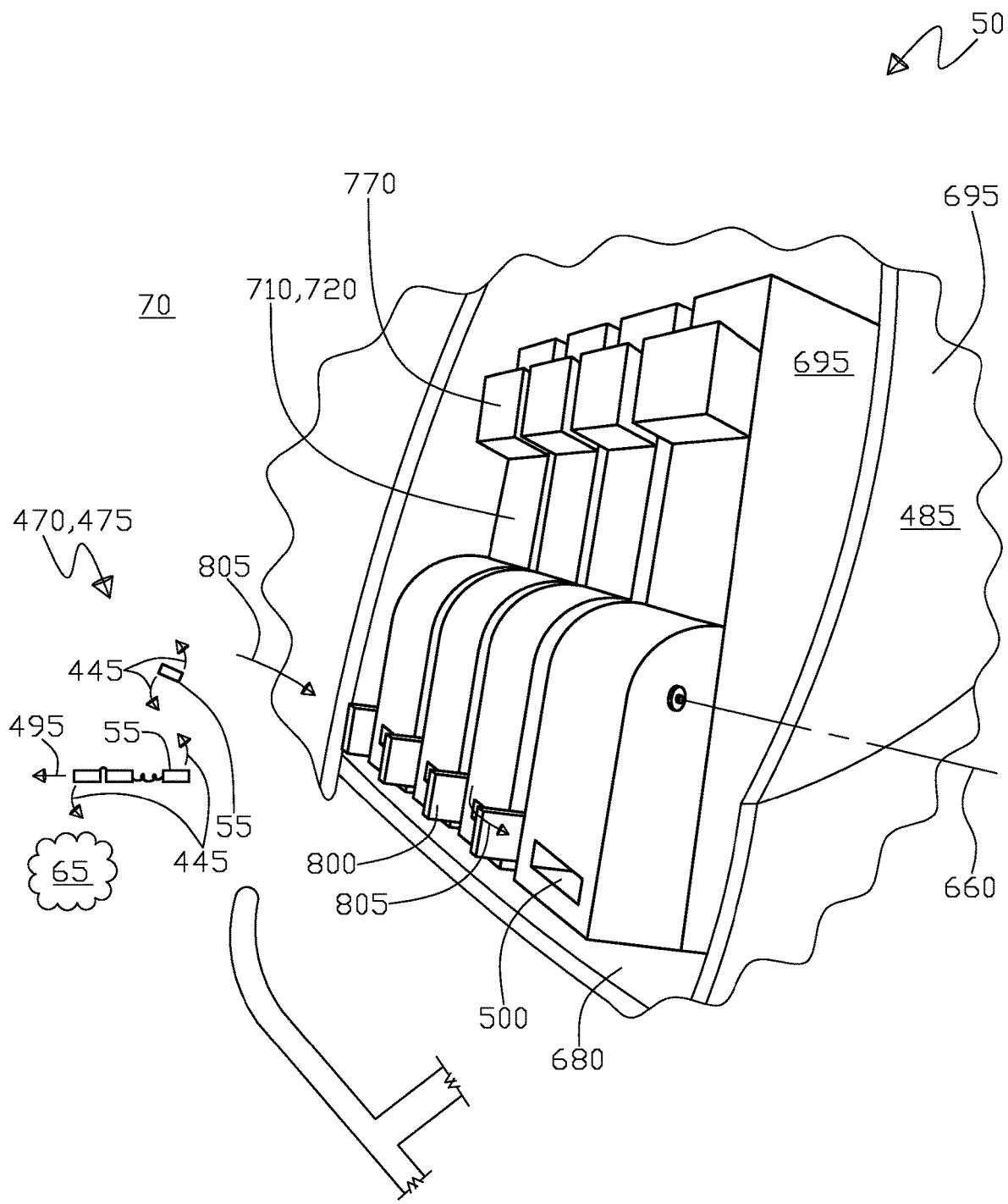

Next, FIG. 2 shows a use drawing for the dispenser apparatus 50 that includes the helicopter 485 with the dispenser apparatus 50 from FIG. 1 shown mounted in the helicopter 485 cargo bay, note that the mounting of the dispenser apparatus 50 could be mounted on either side of the helicopter 485, as the helicopter 485 cargo bay has openings on either side of the helicopter 485, also shown for invention clarity, the helicopter 485 could be flying or on the ground, as the articles 55 are being dispensed from the bench ejector 500, wherein more importantly the articles 55 are ejected in a spinning manner 445 to impart a centrifugal force moment 495 to the article 55 to have the article 55 to separate 495 and expand along its long axis 85 to land in and get tangled within the growth thicket 65, wherein the article 55 is fully described in the patent application that this application is a continuation in part of;

Continuing, FIG. 3 shows a close up perspective view of FIG. 2, wherein FIG. 3 shows the dispenser apparatus 50 ejecting 470 the articles 55 over the growth thicket 65, noting in particular the planar wind deflectors 800 being one for each dispenser apparatus 50 that are placed upstream of the bench ejector 500 to deflect the forward wind velocity 805 of the helicopter 485 that was found to interfere with the article 55 ejection 470 from the bench 500, thus through empirical testing the planar wind deflectors 800 were sized and configured to reduced the airflow 805 interference with the bench ejectors 500 function.

Figure 4:
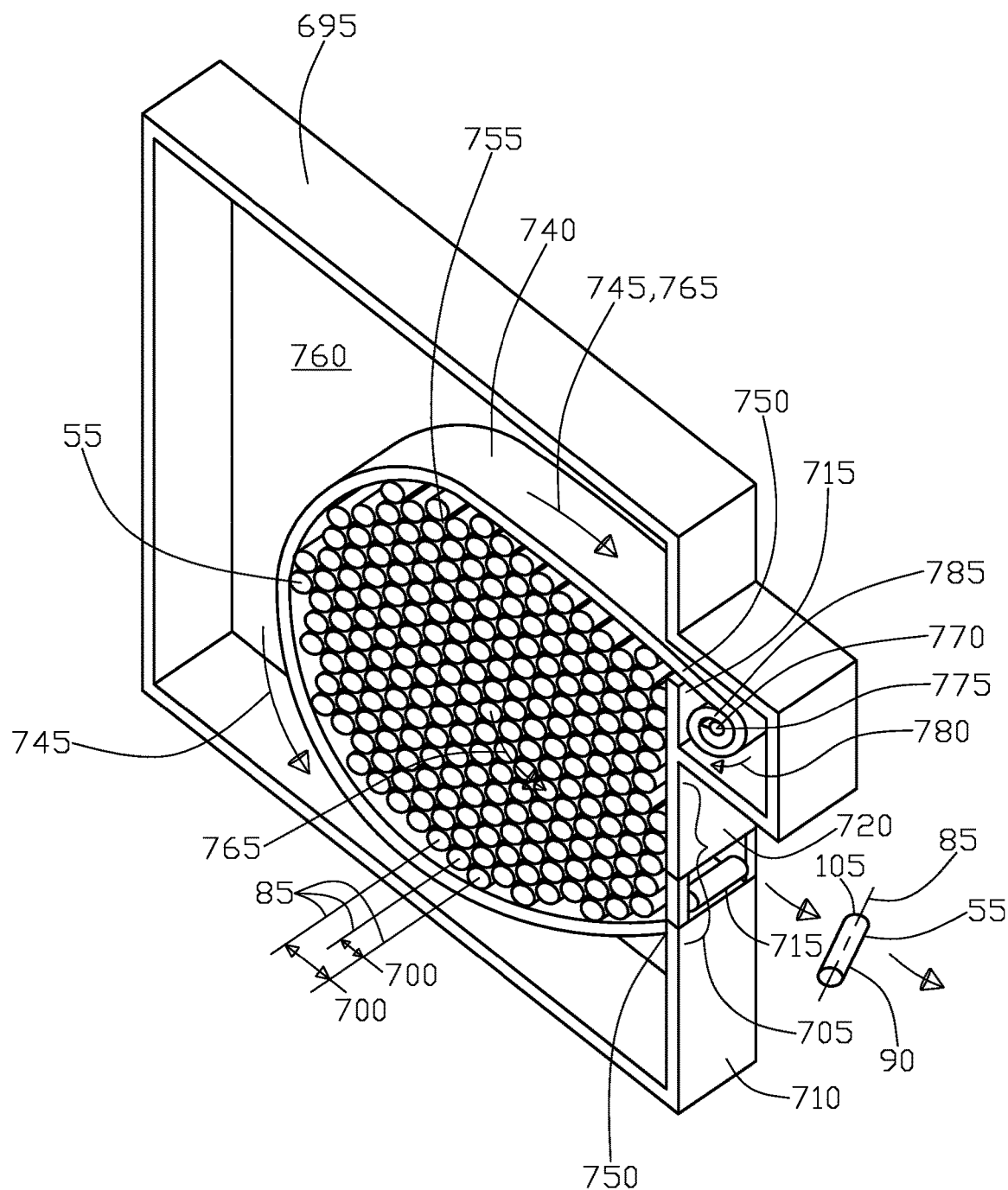

Moving onward, FIG. 4 shows a cutaway perspective view of the feed chamber structure 695 that essentially holds a supply of a plurality of articles 55, the feed chamber 695 is shown in FIGS. 1, 2, and 3, as being positioned behind the bench ejector 500, i.e. the articles 55 are feed 630 into the bench ejector 500 from behind, wherein FIG. 4 shows the plurality of articles 55 stacked such that the articles 55 each have a long axis 85, wherein the plurality of long axes 85 are parallel 700 to one another in the packed or stacked configuration for the plurality of stored articles 55. Noting that FIG. 4 shows the stacked articles 55 are bunched together via a tension strap 740 that urges 765 the plurality of articles 55 toward an outlet aperture 705, also noting that in this view a retention door 720 covers the outlet aperture 705 to prevent the plurality of articles 55 from being forced out through the outlet aperture 705 due to the tension band 740 when the feed chamber structure 695 is not engaged to the bench ejector 500, as shown in FIG. 4.

Figure 5:
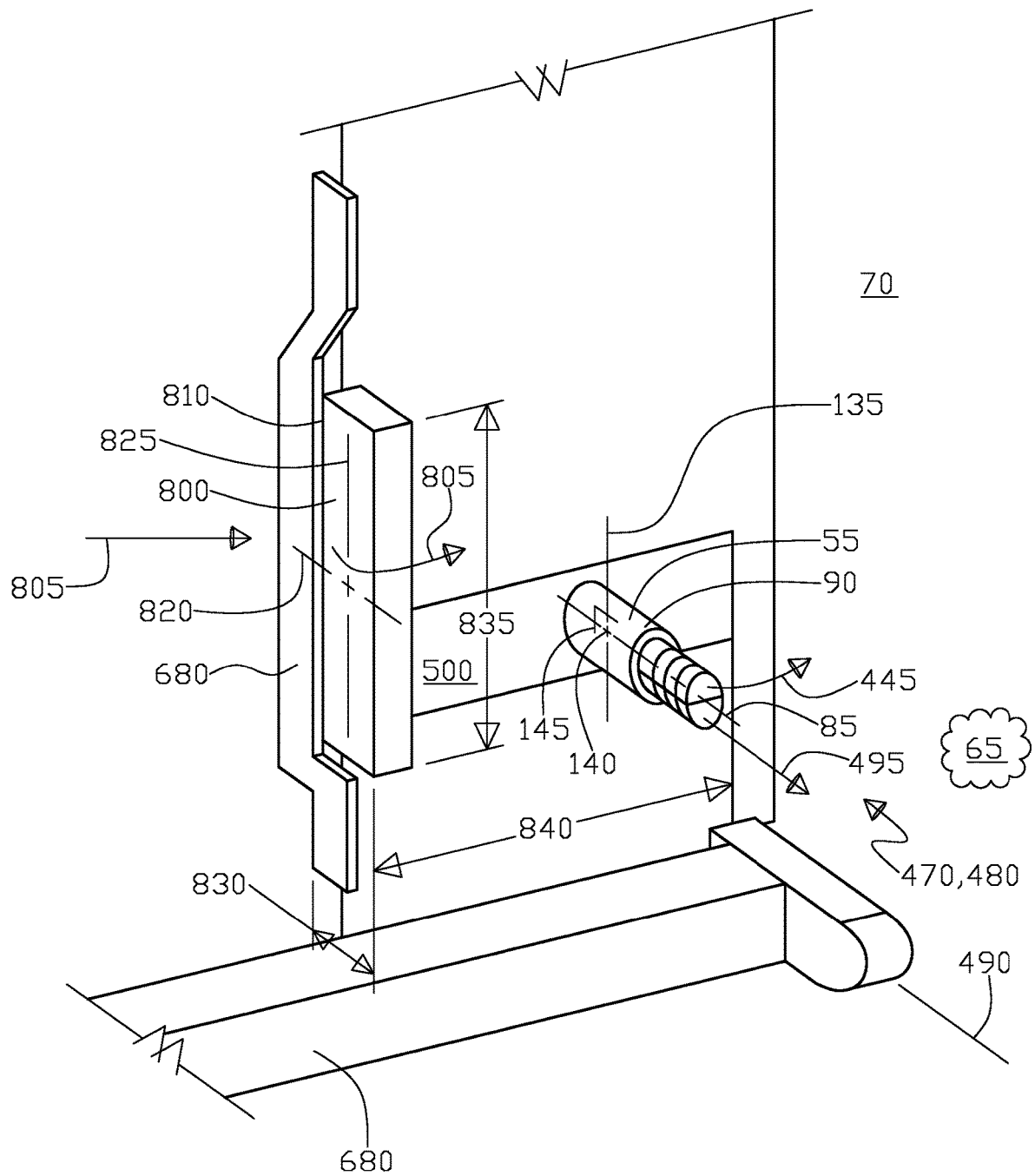
FIG. 5 shows a close up perspective view of the bench ejector as mounted in a frame and particularly shown in detail is the planar air flow deflector as positioned to a single bench ejector with further the sizing and configuring of the planar air flow deflector along its extension axis and its span axis, as the planar air flow deflector is attached to the frame, further shown is the article ejecting from the bench with the rotational moment and the long axis extension movement of the article.

Yet further, FIG. 5 shows a close up perspective view of the bench ejector 500 as mounted in a frame 680 and particularly shown in detail is the planar air flow deflector 800 as positioned to a single bench ejector 500 with further the sizing and configuring of the planar air flow deflector 800 along its extension axis 820 and its span axis 825, as the planar air flow deflector 800 is attached 810 to the frame 680, further shown is the article 55 ejecting 470 from the bench 500 with the rotational moment 445 and axis 85 extension movement 495 of the article 55.

Figure 6:
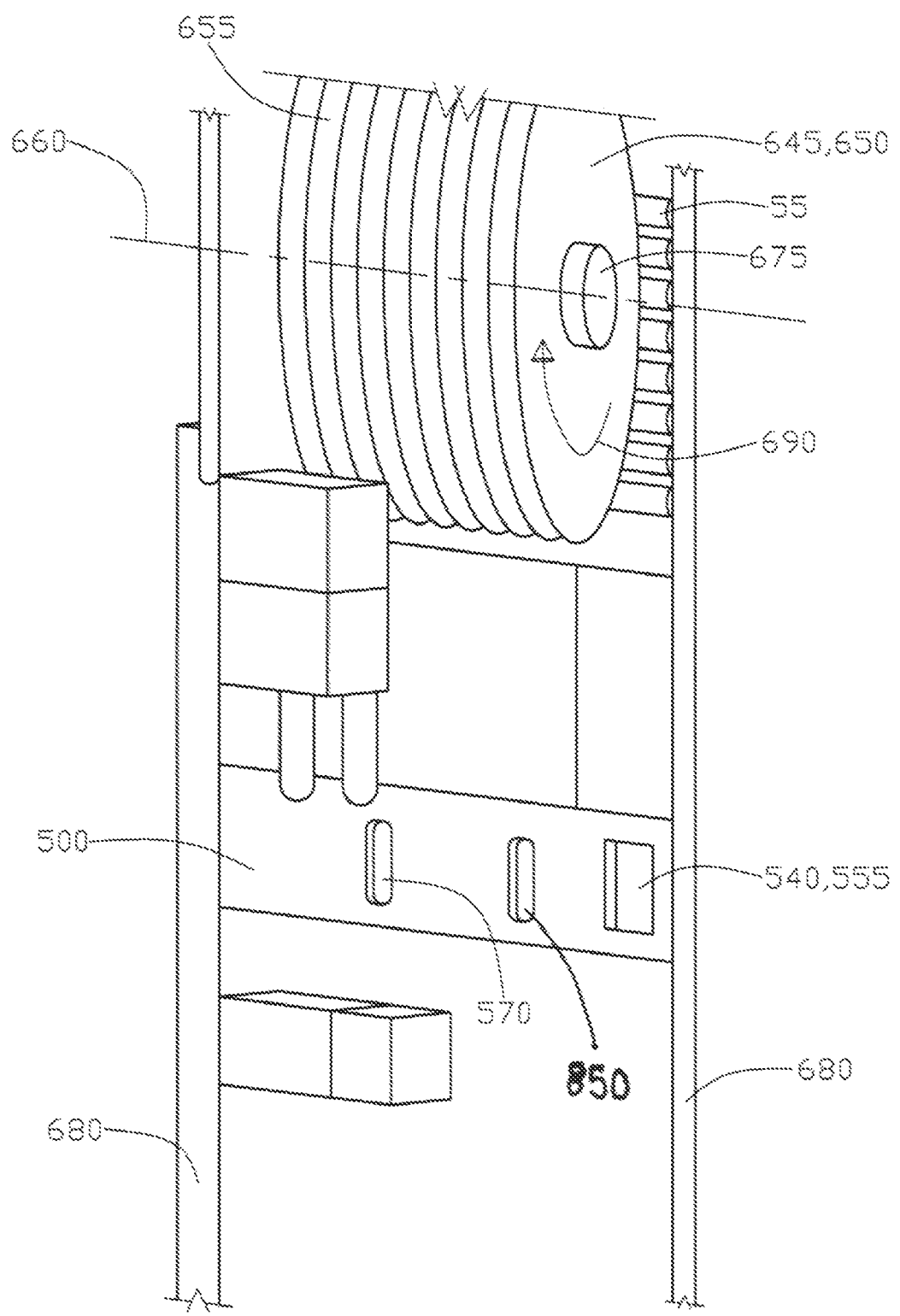
FIG. 6 shows a perspective view of the bench ejector with a housing cover removed to expose the rotating drum with its rotational axis that agitates and helps to guide and move the plurality of articles from the feed chamber structure to the bench ejector, the plurality of articles are in this view behind the rotating drum wherein the rotating drum has a rubber outer periphery to add friction to help move the plurality of articles, also shown in the bench are an arm with a retention finger for momentarily holding the article while a reciprocating beam impacts the article to impart the rotational moment to the article as it exits the bench ejector.

Continuing, FIG. 6 shows a perspective view of the bench ejector 500 with a housing cover removed to expose the rotating drum 645, 650 with its rotational axis 660 that agitates and help to guide and move the plurality of articles 55 from the feed chamber structure 695 to the feed channel structure 625 to the bench ejector 500, the plurality of articles 55 are in this view behind the rotating drum 650 wherein the rotating drum 650 has a rubber outer periphery 655 to add friction to help move the plurality of articles 55. Also shown in FIG. 6 is the bench 500 with an arm 540 having a retention finger 555 for momentarily holding 610 the article 55, while a reciprocating beam 570 impacts 600 the article 55 to impart the rotational moment 445 to the article 55 as it exits the bench ejector 500.

Figure 7:
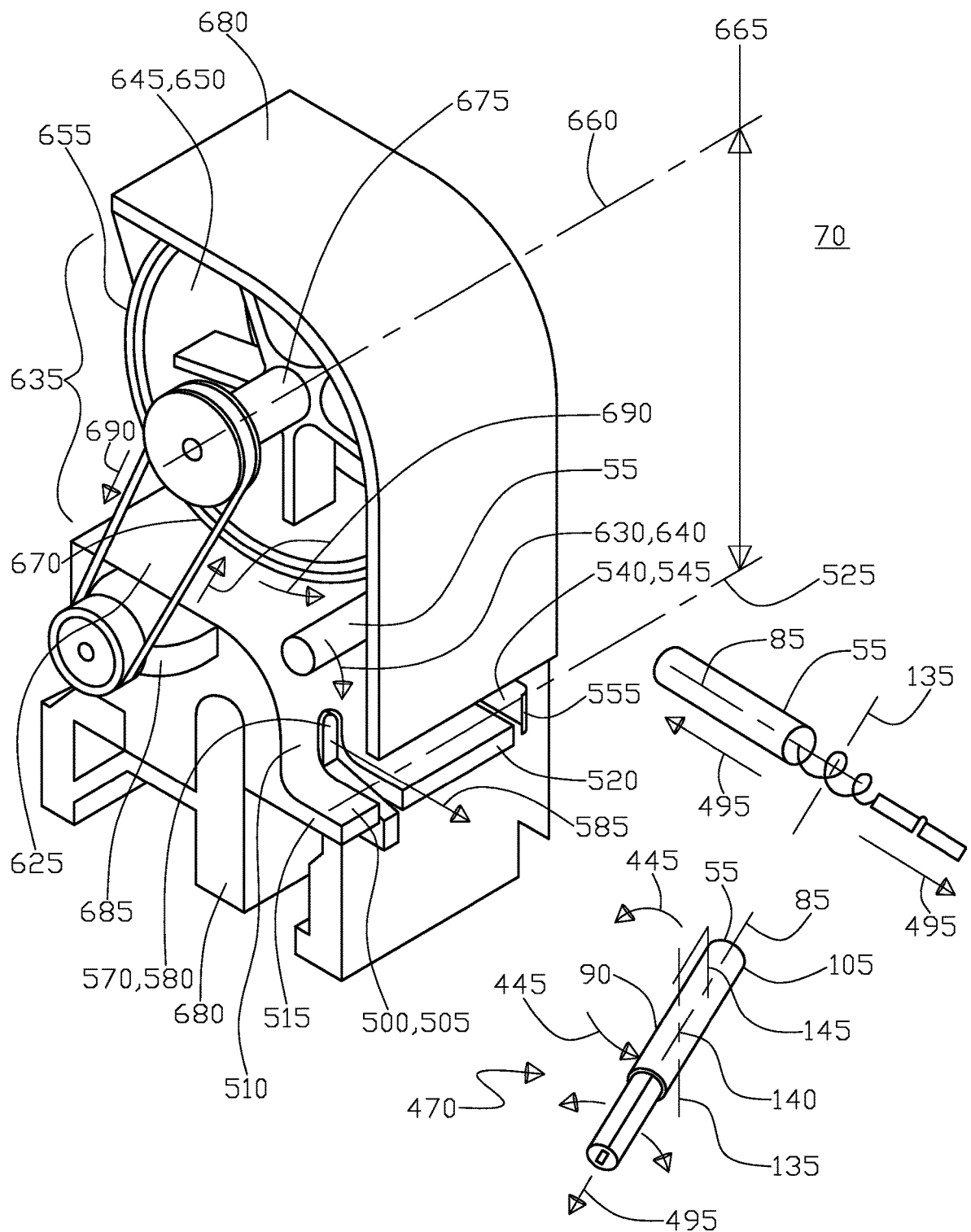
FIG. 7 shows a perspective cutaway view of the rotating drum and bench ejector as a sub assembly, wherein the rotating drum and its rubber outer periphery are helping to guide and move the plurality of articles through a feed channel structure that communicates with the bench ejector, wherein the rotating drum is supported by a hub with a rotational attachment at the drum rotational axis with the drum being rotationally driven by a motor with all attached to the frame, further shown are the arm with the retention finger along with the reciprocating beam wherein the plurality of articles are moved through the feed channel structure into the bench to be ejected by the reciprocating beam in conjunction with the retention finger to impart a rotational moment to the ejected article that axially separates along its long axis.

Next, FIG. 7 shows a perspective cutaway view of the rotating drum 650 and bench ejector 500 with the feed channel structure 625 all as a sub assembly, wherein the rotating drum 650 and its rubber outer periphery 655 are helping to guide 630 and move 640 the plurality of articles 55 through the feed channel structure 625 that communicates 630 with the bench ejector 500, wherein the rotating drum 650 is supported by a hub 675 with a rotational attachment at the drum rotational axis 660 with the drum 650 being rotationally driven by a motor 685 with all attached to the frame 680. Further shown in FIG. 7 is the arm 540 with the retention finger 555 along with the reciprocating beam 570 wherein the plurality of articles 55 are moved 630, 640 through the feed channel structure 625 into the bench 500 to be ejected 470 by the reciprocating beam 570 in conjunction with the retention finger 555 to impart a rotational moment 445 to the ejected article 55 that axially separates 495 along the article 55 long axis 85.

Figure 8:
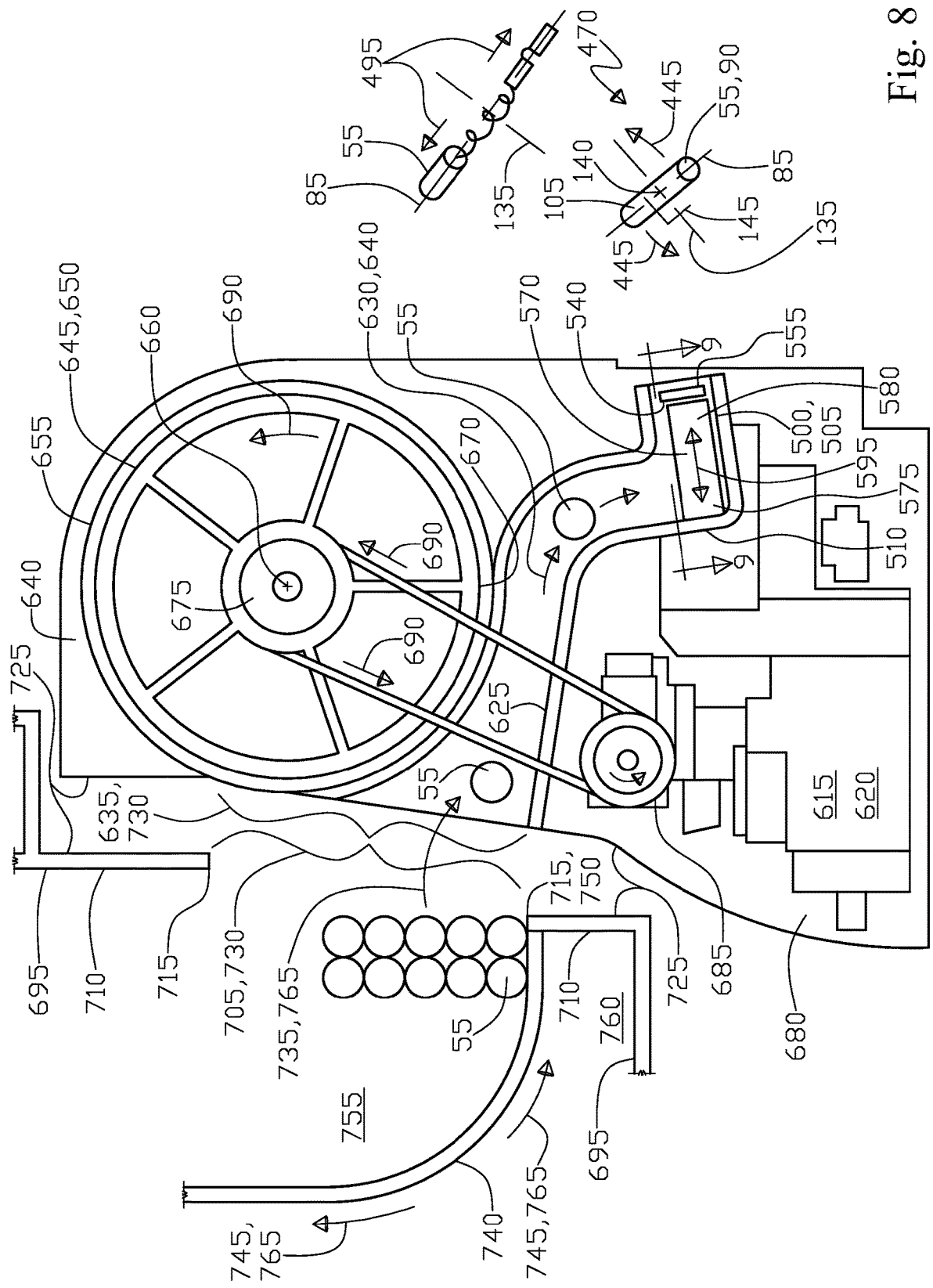
FIG. 8 shows a side elevation view of the rotating drum and bench ejector as a sub assembly, wherein the rotating drum and its rubber outer periphery are helping to guide and move the plurality of articles through a feed channel structure that communicates with the bench ejector, wherein the rotating drum is supported by a hub with a rotational attachment at the drum rotational axis with the drum being rotationally driven by a motor with all attached to the frame, further shown are the arm with the retention finger along with the reciprocating beam wherein the plurality of articles are moved through the feed channel structure into the bench to be ejected by the reciprocating beam in conjunction with the retention finger to impart a rotational moment to the ejected article that axially separates, also shown is the feed chamber structure as removably engaged to the bench ejector and rotating drum assembly wherein the outlet aperture and the bench ejector inlet aperture are matched to facilitate communication of the articles from the feed chamber through the outlet aperture and through the inlet aperture to the feed channel structure and finally to the bench ejector, noting that the retention door is opened that closes off the outlet aperture when the feed chamber is not engaged to the bench ejector.

Moving onward, FIG. 8 shows a side elevation view of the rotating drum 650 and bench ejector 500 with feed channel structure 625 sub assembly, wherein the rotating drum 650 and its rubber outer periphery 655 are helping to guide 630 and move 640 the plurality of articles 55 through the feed channel structure 625 that communicates 630 with the bench ejector 500, wherein the rotating drum 650 is supported by a hub 675 with a rotational attachment at the drum rotational axis 660 with the drum 650 being rotationally driven by a motor 685 with all attached to the frame 680. Further shown in FIG. 8 is the arm 540 with the retention finger 555 along with the reciprocating beam 570 wherein the plurality of articles 55 are moved 630, 640 through the feed channel structure 625 into the bench 500 to be ejected by the reciprocating beam 570 in conjunction with the retention finger 555 to impart a rotational moment 445 to the ejected article 55 that axially separates 495 along the article 55 long axis 85.

Also FIG. 8 shows the feed chamber structure 695 as removably engaged to the bench ejector 500 and rotating drum assembly 650 wherein the outlet aperture 705 and the bench ejector 500 inlet aperture 635 are matched 730 to facilitate communication 735 of the articles 55 from the feed chamber 695 through the outlet aperture 705 and through the inlet aperture 635 to the feed channel structure 625 and finally to the bench ejector 500, noting that the retention door 720 is opened that closes off the outlet aperture 705 when the feed chamber 695 is not engaged 725 to the bench ejector 500. Note that for pictorial clarity in FIG. 8 the plurality of articles 55 do not completely fill up the primary interior 755, as they are shown to do accurately in FIG. 4.

Figure 9:
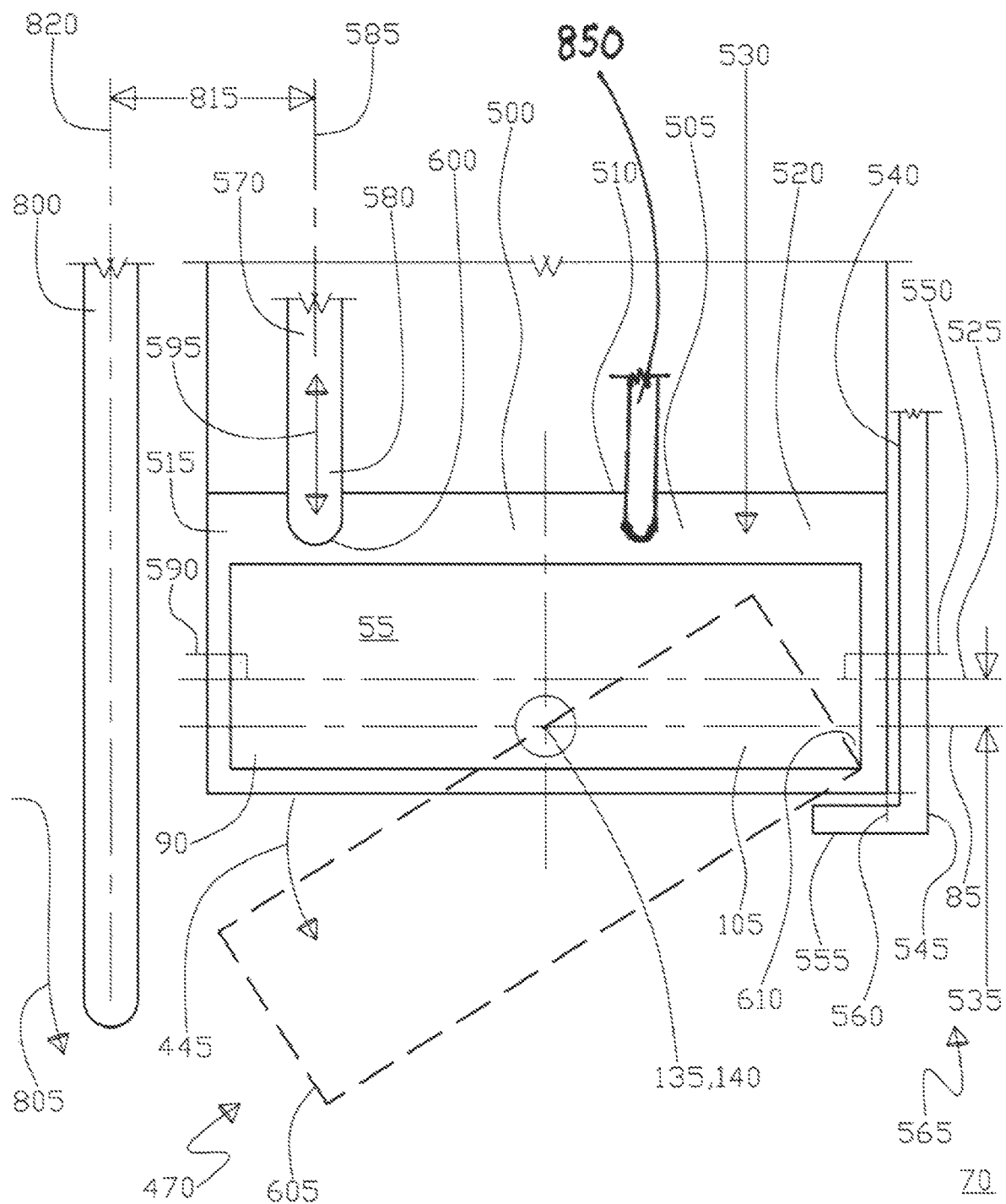
FIG. 9 shows view 9-9 from FIG. 8 that shows detail of the bench ejector with the seat and the back plus the retention arm and finger along with the reciprocating beam, with the article in place nested in the bench seat and back with the arm and retention finger in place about the article, the dotted line showing the progressive movement of the article as it ejects from the bench, further shown in the planar air deflector in positional relation to the bench ejector.

Continuing, FIG. 9 shows view 9-9 from FIG. 8 that shows detail of the bench ejector 500 with the seat 505 and the back 510, plus the retention arm 540 and finger 555 along with the reciprocating beam 570, with the article 55 in place nested 565 in the bench seat 505 and the back 510 with the arm 540 and retention finger 555 in place about the article 55, wherein the dotted line showing the progressive 445, 470 movement of the article 55 as it ejects from the bench 500, further shown in the planar air deflector 800 in positional relation to the bench ejector 500.

Broadly, the present invention is of the dispenser apparatus 50 for ejecting 470 an article 55 into a selected external environment 70, the article 55 having a first end portion 90 and an opposing second end portion 105 with a long axis 85 therebetween, the article 55 further having an article 55 rotational axis 135 disposed between in position 140 of the first 90 and second 105 end portions that is perpendicular 145 to the long axis 85, see in particular FIGS. 2, 3, 7, 8, and 9. The dispenser apparatus itself 50 includes a long open tray in the form of a bench ejector 500 having a seat 505 and a back 510, the bench 500 having a primary end portion 515 and an opposing secondary end portion 520 with a longitudinal axis 525 therebetween, the bench 500 is sized and configured to cradle 530 the article 55 such that positionally the longitudinal axis 525 and the article 55 long axis 85 are substantially parallel 535 to one another, see FIGS. 7, 8, and 9 in particular and also FIG. 6.

Further included in the dispenser apparatus 50 is an arm 540 that is disposed on and affixed to the bench 500 secondary end portion 520, the arm 540 including a planar secondary end structure 545 on the bench 500, the planar secondary end structure 545 is substantially perpendicular 550 to the longitudinal axis 525, the planar secondary end structure 545 extending from the back 510 toward the seat 505, wherein the planar secondary end structure 545 terminates in a substantially perpendicular 560 finger 555 facing the bench 500, wherein a portion of the seat 505, a portion of the back 510, the planar secondary end structure 545, and the finger 555 all act to loosely nest 565 the article 55 second end portion 105, see FIG. 9 in particular and FIGS. 6, 7, and 8.

Also included in the dispenser apparatus 50 is a beam 570 disposed on the bench 500 primary end portion 515, the beam 570 having a beam proximal end portion 575 and an opposing beam distal end portion 580, the beam 570 having a beam lengthwise axis 585 that is between the beam proximal 575 and distal 580 end portions, the beam 570 lengthwise axis 585 is substantially perpendicular 590 to the bench longitudinal axis 525, the beam having reciprocating movement 595 along the beam 570 lengthwise axis 585, see in particular FIGS. 7, 8, and 9. Wherein the beam 570 reciprocating movement 595 extending away from and retracting toward the bench 500 back 510, again see FIGS. 7, 8, and 9. The beam 570 distal end portion 580 is operational to contact 600 the article 55 first end portion 90 and push 605 the article 55 first end portion 90 along the bench 500 seat 505 away from the bench back 510 while the arm 540 finger 555 momentarily retains the article 55 second end portion 105 that is momentarily nested 610 in the bench 500 seat 505 and back 510, thus operationally resulting in the initial rotational moment movement 445 imparted into the article 55 wherein the rotational moment movement 445 is about the rotational article 55 rotational axis 135 while simultaneously the article 55 ejects away 475, 480 from the bench 500 into the external environment 70 continuing to have the rotational moment movement 445 until the article 55 expands axially 495 along the article 55 long axis 95, see FIGS. 2 and 3, plus FIGS. 5, 7, 8, and 9. In addition, included in the dispenser apparatus 50 is a means 615 for imparting the reciprocating movement 595 to the beam 570, see FIGS. 7 and 8.

Alternatively for the dispenser apparatus 50, the means 615 for imparting the reciprocating movement 595 to the beam 570 is preferably constructed of an electrically powered solenoid 620, as best shown in FIGS. 7 and 8.

Another option for the dispenser apparatus 50, is that it can further comprise a feed channel structure 625 affixed to and in communication 630 with the bench 500 back 510, the feed channel structure 625 extends from the bench 500 back 510 in a direction opposite from the bench 500 seat 505, wherein the feed channel structure 625 terminates in the inlet aperture 635, wherein operationally the feed channel structure 625 directs a plurality of the articles 55 into the bench 500 one at a time from the inlet aperture 635, as best shown in FIGS. 7 and 8.

A further option for the dispenser apparatus 50, is that it can further comprise a means 645 to agitate, guide, and shuttle the plurality of articles 55 therethrough the feed channel structure 625 to the bench 500, see in particular FIGS. 7 and 8, plus FIG. 6, and FIGS. 1 and 3 for overall positional placement for the means 645 to agitate, guide, and shuttle the plurality of articles 55 therethrough the feed channel structure 625.

Continuing for the means 645 on the dispenser apparatus, the means 645 to agitate, guide, and shuttle the plurality of articles 55 therethrough the feed channel structure 625 to the bench 500, the means 645 is preferably constructed of a rotating drum 650 with a rubber outer periphery 655, the drum 650 has a drum rotational axis 660 that is positioned parallel 665 to the bench 500 longitudinal axis 525, the drum 650 outer periphery 655 is also positioned adjacent 670 to a portion of the feed channel structure 625 mounted on a rotating hub 675 via the frame structure 680 that is common to the rotating drum 650, the feed channel structure 625, and the bench 500, see FIGS. 7 and 8 in particular, plus FIGS. 1, 3, and 6. Additionally for the drum 650, it is preferably rotationally driven by a drive motor 685 in a preferred rotational direction 690 as best shown in FIGS. 6, 7, and 8, wherein the drive motor 685 is affixed to the frame structure 680, wherein the drive motor 685 rotates the drum 650. Further the drive motor 685 can include control circuitry that alters a drum rotation 690 direction such that the drum rotation direction 690 is intermittently reversed while trending or predominantly moving in a single rotational direction 690, to operationally help agitate, guide, and shuttle the plurality of articles 55 therethrough the feed channel structure 625 to the bench 500, the preferably revolution per minute (rpm) for drum rotation 690 is about in the range of 30 to 60 rpm, noting that the reversing drum rotation 690 can be continuous or intermittent.

As another optional enhancement for the dispenser apparatus 50, it can further comprise an article 55 storage and feed chamber structure 695 that is in the form of a rectangular parallelepiped that is sized and configured to hold a plurality of the articles 55, see FIG. 4 in particular, wherein in the article 55 storage and feed chamber structure 695 the articles 55 long axes 85 are all parallel 700 to one another, again see FIG. 4 for this article 55 relative stacking configuration disposed within the article 55 storage and feed chamber structure 695. The rectangular parallelepiped structure 695 also has an outlet aperture 705 disposed therethrough a portion 715 of a small side 710 of the rectangular parallelepiped structure 695, the outlet aperture 705 that is functional to discharge the articles 55 from the rectangular parallelepiped structure 695, the rectangular parallelepiped structure 695 is removably engaged 725 to the feed channel structure 625 such that the outlet aperture 705 and the inlet aperture 635 are matched 730 to one another to allow communication 735 of the plurality of articles 55 from the feed chamber structure 695 to the feed channel structure 625, see FIG. 8 in particular, also see FIGS. 6 and 7, plus see FIGS. 1, 2, and 3, for overall positional placement of the feed storage chamber 695 in relation to the entire dispenser apparatus 50.

Again, referring in particular to FIG. 4, for the dispenser apparatus 50, wherein the feed storage chamber structure 695 can further comprise a flexible band 740 whose ends are urged 745 toward one another and further the band ends are attached 750 to opposing portions of a margin of the outlet aperture 705, wherein the band 740 forms a primary interior 755 within the rectangular parallelepiped structure 695, wherein the primary interior 755 is in communication with the outlet aperture 705 and further the band 740 forms a secondary interior 760 within the rectangular parallelepiped structure 695 that is not in communication with the outlet aperture 705, again see FIG. 4. Wherein operationally, the band 740 forces the plurality of articles 55 toward 765 the outlet aperture 705 via reducing a volume of the primary interior 755 as more articles 55 are feed therethrough the outlet aperture 705, in addition to looking at FIG. 4, also see FIGS. 6, 7, and 8.

Continuing, for optional enhancements for the article 55 storage and feed chamber structure 695 as a part of the dispenser apparatus 50, and looking at again FIG. 4 in particular, wherein the band 740 ends being urged 745 toward one another is preferably constructed of a band 740 take-up reel 770 that is rotationally attached 775 to one of the opposing outlet aperture 705 portions 715, wherein the band 740 take-up reel 770 is rotationally biased 780 via a wound spring 785 to keep a rotational tension 745, 765, & 780 on the band 740 to keep feeding 765 the plurality of articles 55 to the outlet aperture 705 as the primary interior 755 volume is reduced, as shown best in FIG. 4, also see FIG. 8.

Focusing on FIGS. 5 and 9 in particular and also on FIG. 3, for the dispenser apparatus 50 can optionally further comprise a planar extension wind deflection tab 800 that is affixed 810 to the frame 680 and positioned adjacent to the bench 500 primary end portion 515, the planar tab 800 extending parallel 815 to the beam 570 lengthwise axis 585, see FIG. 9 in particular. The planar tab 800 is operational to facilitate easier deployment 470 of the article 55 from the bench 500 from the beam 570 reciprocating movement 595 via helping to block interference airflow 805 when the dispenser apparatus 50 is deploying the article 55 a moving aircraft 485, see FIGS. 2 and 3.

Again focusing on FIGS. 5 and 9 in particular and also on FIG. 3, for the dispenser apparatus 50 on the optional planar extension wind deflection tab 800 enhancements that can include the planar tab 800 having an extension axis 820 that is parallel 815 to the beam lengthwise axis 585 and the planar tab 800 further has a perpendicular span axis 825, wherein the planar tab 800 extends a distance 830 along the extension axis 820 that is about one-half a distance 840 from the bench 500 primary end portion 515 to the bench secondary end portion 520 and the planar tab 800 has a span distance 835 along the span axis 825 that is about equal to a distance 840 from the bench 500 primary end portion 515 to the bench 500 secondary end portion 520, see in particular FIG. 5, as these dimensions 830 & 835 were empirically determined to best help reduce aircraft 485 airflow 805 interference with article 55 deployment 470.

Also optionally, focusing in particular on FIG. 4, for the dispenser apparatus 50, the take-up reel 770 spring 785 can further comprise a one-way rotational ratchet that is operational to only allow the flexible band 740 ends being urged 745 toward one another, wherein the flexible band 740 urging direction 745 cannot reverse thus only allowing the primary interior 755 volume to reduce, the purpose of this is to prevent the plurality of articles 55 from becoming "unpacked" as they are shown in FIG. 4 with the articles 55 being adjacent to one another with their long axes 85 parallel 700 to one another, if the aircraft 485 were to roll and cause due to the weight of the articles 55 the urging 745 of the flexible band 740 to be overcome (reversed) that would undesirably allow the articles 55 to become "unpacked" (loose) relative to one another, i.e. allowing space between the articles 55.

Further optionally for the dispenser apparatus 50, it can further comprise an index extension structure 850 that is disposed in the bench 500 back 510 therebetween the beam 570 and the arm 540, the index extension structure 850 having reciprocating movement, timing, and direction that are all substantially parallel and matching to the beam 570 reciprocating movement 595, the index extension structure 850 is operational to be in conjunction with the beam 570 to advance a single article 55 from the bench 500 back 510 to the bench 500 seat 505 prior to ejecting 470 the article 55 from the bench 500 into the external environment 70, see FIGS. 6 and 9.

CONCLUSION

Accordingly, the present invention of the dispenser apparatus has been described with some degree of particularity directed to the embodiments of the present invention. It should be appreciated, though; that the present invention is defined by the following claims construed in light of the prior art so modifications or changes may be made to the exemplary embodiments of the present invention without departing from the inventive concepts contained therein.

The invention claimed is:

1. A dispenser apparatus for ejecting an article to an external environment, the article having a first end portion and an opposing second end portion with a long axis therebetween, the article further having an article rotational axis disposed between the first and second end portions that is perpendicular to the long axis, said dispenser apparatus comprising:

(a) a long open tray in the form of a bench having a seat and a back, said bench having a primary end portion and an opposing secondary end portion with a longitudinal axis therebetween, said bench is sized and configured to cradle the article such that positionally said longitudinal axis and the long axis are substantially parallel to one another;

(b) an arm disposed on said bench secondary end portion, said arm including a planar secondary end structure on said bench, said planar secondary end structure is substantially perpendicular to said longitudinal axis, said planar secondary end structure extending from said back toward said seat wherein said planar secondary end structure terminates in a substantially perpendicular finger facing said bench, wherein a portion of said seat, a portion of said back, said planar secondary end structure, and said finger all act to loosely nest the article second end portion;

(c) a beam disposed on said bench primary end portion, said beam having a beam proximal end portion and an opposing beam distal end portion, said beam having a beam lengthwise axis that is between said beam proximal and distal end portions, said beam lengthwise axis is substantially perpendicular to said bench longitudinal axis, said beam having reciprocating movement along said beam lengthwise axis, said beam reciprocating movement extending away from said bench back and retracting toward said bench back, said beam distal end portion is operational to contact the article first end portion and push the article first end portion along said bench seat away from said bench back while said arm finger retains the article second end portion momentarily nested in said bench seat and back, this operationally results in rotational moment movement imparted into the article wherein the rotational moment movement is about the rotational article axis while simultaneously the article ejects away from said bench into the external environment continuing to have the rotational moment movement; and (d) a means for imparting said reciprocating movement to said beam.

2. A dispenser apparatus for ejecting the article to the external environment according to claim 1 wherein said means for imparting said reciprocating movement to said beam is constructed of an electrically powered solenoid.

3. A dispenser apparatus for ejecting the article to the external environment according to claim 1 further comprising a feed channel structure affixed to and in communication with said bench back, said feed channel structure extends from said bench back in a direction opposite from said bench seat, wherein said feed channel structure terminates in an inlet aperture, wherein operationally said feed channel structure directs a plurality of the articles into said bench one at a time.

4. A dispenser apparatus for ejecting the article to the external environment according to claim 3 further comprising a means to agitate, guide, and shuttle the plurality of articles therethrough said feed channel structure to said bench.

5. A dispenser apparatus for ejecting the article to the external environment according to claim 4 wherein said means to agitate, guide, and shuttle the plurality of articles therethrough said feed channel structure to said bench is constructed of a rotating drum with a rubber outer periphery, said drum has a drum rotational axis that is positioned parallel to said bench longitudinal axis, said drum outer periphery is also positioned adjacent to a portion of said feed channel structure, said rotating drum is mounted on a rotating hub being rotationally attached to a frame structure that is common to said rotating drum, said feed channel structure, and said bench.

6. A dispenser apparatus for ejecting the article to the external environment according to claim 5 further comprising a drive motor affixed to said frame structure, wherein said drive motor rotates said drum, further said drive motor includes control circuitry that alters a drum rotation direction such that said drum rotation direction is intermittently reversed while trending or predominantly moving in a single rotational direction.

7. A dispenser apparatus for ejecting the article to the external environment according to claim 3 further comprising an article storage and feed chamber structure that is a rectangular parallelepiped that is sized and configured to hold a plurality of the articles wherein the article long axes are all parallel to one another, said rectangular parallelepiped structure has an outlet aperture disposed therethrough a portion of a small side of said rectangular parallelepiped structure, said outlet aperture is functional to discharge the articles from said rectangular parallelepiped structure, said rectangular parallelepiped structure is removably engaged to said feed channel structure such that said outlet aperture and said inlet aperture are matched to one another to allow communication of the plurality of articles from said feed chamber structure to said feed channel structure.

8. A dispenser apparatus for ejecting the article to the external environment according to claim 7 wherein said feed chamber structure further comprises a flexible band whose ends are urged toward one another and further said band ends are attached to opposing portions of a margin of said outlet aperture, wherein said band forms a primary interior within said rectangular parallelepiped structure, wherein said primary interior is in communication with said outlet aperture and further said band forms a secondary interior within said rectangular parallelepiped structure that is not in communication with said outlet aperture, wherein operationally said band forces the plurality of articles toward said outlet aperture via reducing a volume of said primary interior as more articles are feed therethrough said outlet aperture.

9. A dispenser apparatus for ejecting the article to the external environment according to claim 8 wherein said band ends being urged toward one another is constructed of a take-up reel that is rotationally attached to one of said opposing outlet aperture portions, wherein said take-up reel is rotationally biased via a spring to keep a tension on said band to keep feeding the plurality of articles to said outlet aperture as said primary interior volume is reduced via a reduction in the articles in said primary interior.

10. A dispenser apparatus for ejecting the article to the external environment according to claim 5 further comprising a planar extension wind deflection tab that is affixed to said frame and positioned adjacent to said bench primary end portion, said planar tab extending parallel to said beam lengthwise axis, said planar tab is operational to facilitate easier deployment of the article from said bench from said beam reciprocating movement via helping to block interference airflow when said dispenser apparatus is deploying the article from a moving aircraft.

11. A dispenser apparatus for ejecting the article to the external environment according to claim 10 wherein said planar tab has an extension axis that is parallel to said beam lengthwise axis and said planar tab further has a perpendicular span axis, wherein said planar tab extends a distance along said extension axis that is about one-half a distance from said bench primary end portion to said bench secondary end portion and said planar tab has a span distance along said span axis that is about equal to a distance from said bench primary end portion to said bench secondary end portion.

12. A dispenser apparatus for ejecting the article to the external environment according to claim 1 further comprising an index extension structure that is disposed in said bench back therebetween said beam and said arm, said index extension structure having reciprocating movement, timing, and direction that is substantially parallel to said beam, said index extension structure is operational to be in conjunction with said beam to advance a single article from said bench back to said bench seat prior to ejecting the article from said bench into the external environment.

13. A dispenser apparatus for ejecting an article to an external environment, the article having a first end portion and an opposing second end portion with a long axis therebetween, the article further having an article rotational axis disposed between the first and second end portions that is perpendicular to the long axis, said dispenser apparatus comprising:
   (a) a long open tray in the form of a bench having a seat and a back, said bench having a primary end portion and an opposing secondary end portion with a longitudinal axis therebetween, said bench is sized and configured to cradle the article such that positionally said longitudinal axis and the long axis are substantially parallel to one another;
   (b) a feed channel structure affixed to and in communication with said bench back, said feed channel structure extends from said bench back in a direction opposite from said bench seat, wherein said feed channel structure terminates in an inlet aperture, wherein operationally said feed channel structure directs a plurality of the articles into said bench one at a time;
   (c) an arm disposed on said bench secondary end portion, said arm including a planar secondary end structure on said bench, said planar secondary end structure is substantially perpendicular to said longitudinal axis, said planar secondary end structure extending from said back toward said seat wherein said planar secondary end structure terminates in a substantially perpendicular finger facing said bench, wherein a portion of said seat, a portion of said back, said planar secondary end structure, and said finger all act to loosely nest the article second end portion;
   (d) a beam disposed on said bench primary end portion, said beam having a beam proximal end portion and an opposing beam distal end portion, said beam having a beam lengthwise axis that is between said beam proximal and distal end portions, said beam lengthwise axis is substantially perpendicular to said bench longitudinal axis, said beam having reciprocating movement along said beam lengthwise axis, said beam reciprocating movement extending away from said bench back and retracting toward said bench back, said beam distal end portion is operational to contact the article first end portion and push the article first end portion along said bench seat away from said bench back while said arm finger retains the article second end portion momentarily nested in said bench seat and back, thus operationally results in rotational moment movement imparted into the article wherein the rotational moment movement is about the rotational article axis while simultaneously the article ejects away from said bench into the external environment continuing to have the rotational moment movement;
   (d) a means for imparting said reciprocating movement to said beam; and
   (e) a rotating drum with a rubber outer periphery, said drum has a drum rotational axis that is positioned parallel to said bench longitudinal axis, said drum outer periphery is also positioned adjacent to a portion of said feed channel structure, said rotating drum is mounted on a rotating hub being rotationally attached to a frame structure that is common to said rotating drum, said feed channel structure, and said bench.

14. A dispenser apparatus for ejecting the article to the external environment according to claim 13 further comprising a drive motor affixed to said frame structure, wherein said drive motor rotates said drum, further said drive motor includes control circuitry that alters a drum rotation direction such that said drum rotation direction is intermittently reversed while trending or predominantly moving in a single rotational direction.

15. A dispenser apparatus for ejecting the article to the external environment according to claim 14 further comprising an article storage and feed chamber structure that is a rectangular parallelepiped that is sized and configured to hold a plurality of the articles wherein the article long axes are all parallel to one another, said rectangular parallelepiped structure has an outlet aperture disposed therethrough a portion of a small side of said rectangular parallelepiped structure, said outlet aperture is functional to discharge the articles from said rectangular parallelepiped structure, said rectangular parallelepiped structure is removably engaged to said feed channel structure such that said outlet aperture and said inlet aperture are matched to one another to allow communication of the plurality of articles from said feed chamber structure to said feed channel structure.

16. A dispenser apparatus for ejecting the article to the external environment according to claim 15 wherein said feed chamber structure further comprises a flexible band whose ends are urged toward one another and further said band ends are attached to opposing portions of a margin of said outlet aperture, wherein said band forms a primary interior within said rectangular parallelepiped structure, wherein said primary interior is in communication with said outlet aperture and further said band forms a secondary interior within said rectangular parallelepiped structure that is not in communication with said outlet aperture, wherein operationally said band forces the plurality of articles toward said outlet aperture via reducing a volume of said primary interior as more articles are feed therethrough said outlet aperture.

17. A dispenser apparatus for ejecting the article to the external environment according to claim 16 wherein said band ends being urged toward one another is constructed of a take-up reel that is rotationally attached to one of said opposing outlet aperture portions, wherein said take-up reel is rotationally biased via a spring to keep a tension on said band to keep feeding the plurality of articles to said outlet aperture as said primary interior volume is reduced via a reduction in the articles in said primary interior.

18. A dispenser apparatus for ejecting the article to the external environment according to claim 17 wherein said take-up reel spring can further comprise a one-way rotational ratchet that is operational to only allow said flexible band ends being urged toward one another, wherein said flexible band urging direction cannot reverse thus only allowing said primary interior volume to reduce.

19. A dispenser apparatus for ejecting the article to the external environment according to claim 13 further comprising a planar extension wind deflection tab that is affixed to said frame and positioned adjacent to said bench primary end portion, said planar tab extending parallel to said beam lengthwise axis, said planar tab is operational to facilitate easier deployment of the article from said bench from said beam reciprocating movement via helping to block interference airflow when said dispenser apparatus is deploying the article from a moving aircraft.

20. A dispenser apparatus for ejecting the article to the external environment according to claim 19 wherein said planar tab has an extension axis that is parallel to said beam lengthwise axis and said planar tab further has a perpendicular span axis, wherein said planar tab extends a distance along said extension axis that is about one-half a distance from said bench primary end portion to said bench secondary end portion and said planar tab has a span distance along said span axis that is about equal to a distance from said bench primary end portion to said bench secondary end portion.

\* \* \* \* \*